US007663471B2

(12) United States Patent
Nakashima et al.

(10) Patent No.: US 7,663,471 B2
(45) Date of Patent: *Feb. 16, 2010

(54) IN-VEHICLE DEVICE REMOTE CONTROL SYSTEM AND METHOD

(75) Inventors: Kazuhiro Nakashima, Kariya (JP);
Kentarou Teshima, Kariya (JP);
Kenichi Ogino, Toyota (JP)

(73) Assignee: DENSO Corporation, Kariya (JP)

( * ) Notice: Subject to any disclaimer, the term of this patent is extended or adjusted under 35 U.S.C. 154(b) by 310 days.

This patent is subject to a terminal disclaimer.

(21) Appl. No.: 11/797,422

(22) Filed: May 3, 2007

(65) Prior Publication Data

US 2008/0001708 A1 Jan. 3, 2008

(30) Foreign Application Priority Data

Jun. 19, 2006 (JP) ............................. 2006-169118

(51) Int. Cl.
*G06K 19/00* (2006.01)
(52) U.S. Cl. .................. 340/5.2; 340/505; 340/506; 340/539.1; 340/539.11; 340/539.13; 340/539.32; 340/572.1; 340/10.1
(58) Field of Classification Search ................. 340/505, 340/506, 539.1, 539.11, 539.13, 539.32, 340/572.1, 10.1
See application file for complete search history.

(56) References Cited

U.S. PATENT DOCUMENTS 6,700,475 B1 3/2004 Geber et al.
7,305,284 B2 * 12/2007 Teshima et al. ............... 701/2

2007/0290796 A1 12/2007 Teshima et al.

FOREIGN PATENT DOCUMENTS

| DE | 10 2004 014 649 | 10/2005 |
| DE | 10 2004 052 904 | 6/2006 |
| JP | 2000-104429 | 4/2000 |
| JP | 2005-146666 | 6/2005 |

OTHER PUBLICATIONS

Korean Intellectual Property Office Notice of Invitation to Submit Opinion dated Aug. 26, 2008 issued in counterpart Korean Application 10-2007-0059347 with English translation.
Office Action issued Oct. 8, 2008 in corresponding U.S. Appl. No. 11/790,966, filed Apr. 30, 2007.
Office Action dated Dec. 15, 2008 issued in corresponding German Application No. 10 2007 023 261.8-51 with an at least partial English-language translation thereof.

* cited by examiner

*Primary Examiner*—Daryl C Pope
(74) *Attorney, Agent, or Firm*—Nixon & Vanderhye P.C.

(57) ABSTRACT

In an in-vehicle device remote control system, a vehicle-side device determines in which detection area an electronic key exists based on a response signal transmitted from the key in response to request signals, and a control door to be operated in correspondence to the detection area in which the key exists. The vehicle-side device notifies a user that the key is an authorized one by light, sound, display or the like on the determined control door. With this operation, it is readily recognized by the user because the user is approaching the control door.

10 Claims, 5 Drawing Sheets

IN-VEHICLE DEVICE REMOTE CONTROL SYSTEM AND METHOD

CROSS REFERENCE TO RELATED APPLICATION

This application relates to and incorporates herein by reference Japanese Patent Application No. 2006-169118 filed on Jun. 19, 2006.

FIELD OF THE INVENTION

The present invention relates to an in-vehicle device remote control system and method, and more particularly to a system and method having a function of conducting bidirectional communication between a vehicle-side device and a mobile device.

BACKGROUND OF THE INVENTION

A conventional system that remotely controls an in-vehicle device conducts bidirectional communication between a vehicle-side device and a mobile device to determine whether the mobile device is an authorized (regular) mobile device carried by a user. For example, this system is disclosed in JP 2000-104429A. This type of remote control system is known as a smart key system, which has a transmitter as the vehicle-side device and conducts a bidirectional communication between the transmitter and the mobile device. As the transmitter, there are normally provided plural transmitters having detection areas different from each other. For example, three transmitters are so disposed as to define the detection areas in a given range outside a right door, a given range outside a left door, and a given range outside a trunk door, respectively. If additional detection areas at the left and right sides of the vehicle are defined as front and rear areas, five transmitters are provided.

Transmission request signals are transmitted to the detection areas from the plural transmitters, respectively. When a mobile device exists within the detection areas in which the transmission request signals are transmitted and received, the transmission request signal is received by the mobile device, and the mobile device transmits a given response signal responsive to the received transmission request signal. The response signal is received by a receiver equipped in the vehicle, and a given matching process is conducted on the response signal by a vehicle-side device. Then, when matching can be made, it is determined that the mobile device that has transmitted the response signal is an authorized mobile device. As a result, an operating state of the in-vehicle device such as a door lock mechanism is controlled based on the determination result.

In the conventional remote control system, it is sometimes difficult that the user recognizes whether the control of the in-vehicle has been conducted based on the determination as a result of the matching, even if it is determined that the device is the authorized mobile device. Under this circumstance, in the remote control system where an in-vehicle device to be controlled is a door lock mechanism, when the door is locked based on the determination that the mobile device that has approached the vehicle and entered the detection area is an authorized mobile device, it is proposed that a compartment lamp is lighted to notify that the door is unlocked, or foot lamps disposed on side mirrors for illuminating the foot areas of front seat doors are lighted to notify that the door is unlocked.

In either of those cases, the same notification operation is executed without distinguishing in the detection area of which transmitter the mobile device exists. However, it is difficult that the user recognizes the fact that the compartment lamp is lighted without closely approaching the vehicle, except for night. Also, even if the foot lamps that are disposed on the side mirrors are lighted, it is difficult to recognize this fact unless the user is present at a position relatively close to the front seat door. For this reason, for example, when the user carrying the mobile device approaches the vehicle toward the rear seat doors, it is not always easy to recognize that the mobile device is determined as the authorized mobile device, and the door is unlocked. Thus, the conventional remote control system is not sufficiently satisfactory to users.

SUMMARY OF THE INVENTION

An object of the present invention is to provide an in-vehicle device remote control system and method that enable a user to readily recognize that a mobile device is accepted as an authorized device for using a vehicle.

According to one aspect, an in-vehicle device remote control system has a vehicle-side device mounted in a vehicle and a mobile device carried by a user for communication with the vehicle-side device. The vehicle-side device includes a plurality of transmitters, a receiver and a control unit. The transmitters are disposed at a plurality of given positions of the vehicle and transmit transmission request signals, which form different detection areas outside doors of the vehicle. The mobile device transmits a response signal in response to the transmission request signal when entering the detection areas. The receiver receives the response signal of the mobile device. The control unit executes a given matching process with respect to the response signal of the mobile device for determining that the mobile device is an authorized mobile device when matching is confirmed. The control unit controls an operation state of the in-vehicle device based on a determination that the mobile device is the authorized mobile device. The control unit determines a detection area in which the mobile device exists based on the response signal of the mobile device and the transmission request signals of the transmitters and sets a door corresponding to the determined detection area as a control door. The control device has a memory that stores a notifying operation with respect to each control door. The control device executes the notifying operation of the control door determined based on storage contents of the memory device.

According to another aspect, a plurality of response request signals are transmitted from a vehicle in different directions in surrounding areas of the vehicle so that a response signal is received from a mobile device in response to any one of the response request signals. A location of the mobile device is determined based on a relation between transmitted response request signals and a received response signal. A reception of the response signal is notified to an outside of the vehicle by a device provided near a door which is closest to a determined location of the mobile device.

According to a further aspect, a plurality of response request signals are transmitted from a vehicle in different directions in surrounding areas of the vehicle so that a response signal is received from a mobile device in response to any one of the response request signals. An environment condition of the vehicle is determined. A reception of the response signal is notified to an outside of the vehicle in a mode variable with a determined environment condition of the vehicle.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
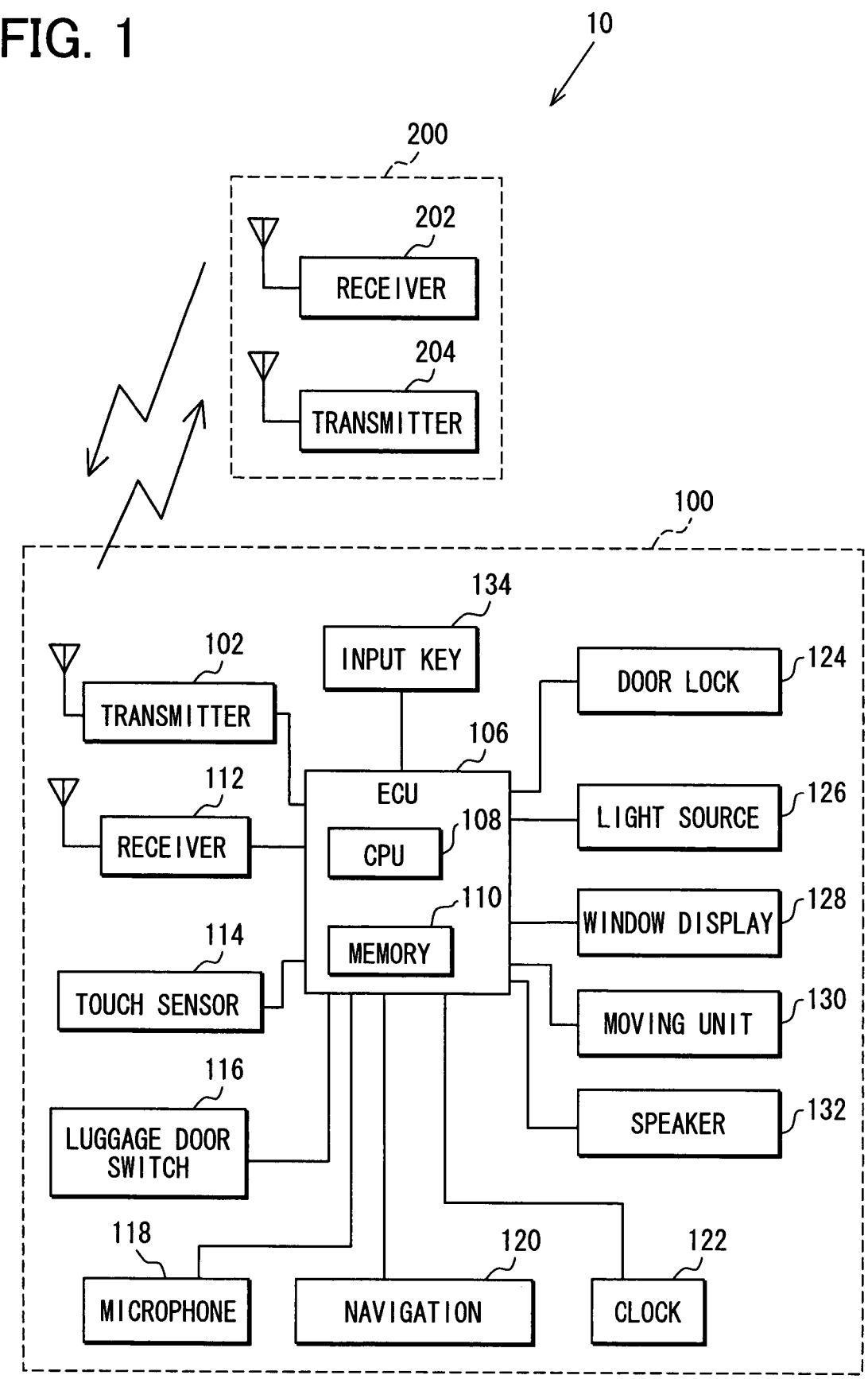
FIG. 1 is a block diagram showing an in-vehicle device remote control system according to an embodiment of the present invention.

Referring to FIG. 1, an in-vehicle device remote control system 10 includes a vehicle-side device 100 mounted in a vehicle, and an electronic key 200 that is employed as a mobile device and carried by a user of a vehicle.

Figure 2:
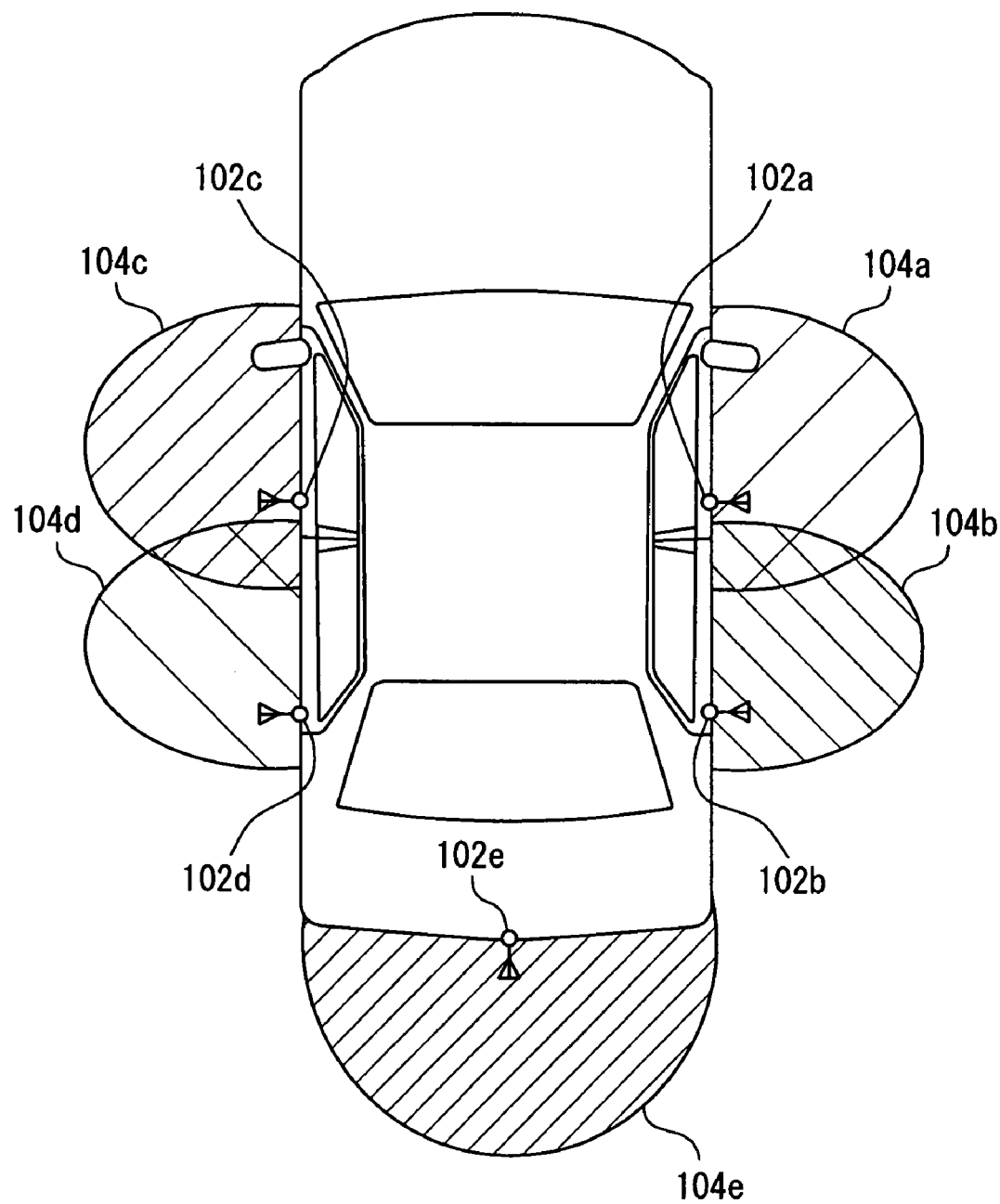
FIG. 2 is a schematic view showing transmitters and detection areas that are formed by the transmitters.

The vehicle-side device 100 has a transmitter 102. In this embodiment, the transmitter 102 has first to fifth transmitters 102a to 102e as shown in FIG. 2.

The first transmitter 102a is disposed at a right front seat door (D seat door indicating a driver's seat-side door) or in the vicinity of the D seat door, so that a first detection area 104a is defined or formed on a right side of the D seat door (outside of the vehicle in the vehicle width direction). The second transmitter 102b is disposed at a right rear seat door (DR seat door indicating a driver's rear-side door) or in the vicinity of the DR seat door, so that a second detection area 104b is formed on a right side of the DR seat door. The third transmitter 102c is disposed at a left front seat door (P seat door indicating a passenger's seat-side door) or in the vicinity of the P seat door, so that a third detection area 104c is formed on a left side of the P seat door. The fourth transmitter 102d is disposed at a left rear seat door (PR seat door indicating a passenger's rear seat door) or in the vicinity of the PR seat door, so that a fourth detection area 104d is formed on a left side of the PR seat door. The fifth transmitter 102e is disposed at a luggage door (LG door) or in the vicinity of the luggage door, so that a fifth detection area 104e is formed in the rear of the luggage door. Each of the five detection areas 104a to 104e is, for example, about 0.7 to 1.0 meters in radius from the corresponding transmitter 102a to 102e.

Returning to FIG. 1, an electronic control unit (ECU) 106 is a computer having a central processing unit (CPU) 108 and a memory 110. The CPU 108 executes various processing according to programs that have been stored in the memory 110 in advance. For example, when the vehicle is parked and the doors are locked, the CPU 108 outputs a request signal that is a transmission request signal to those five transmitters 102a to 102e in order or sequentially at every given period that is set to a short period of time such as about 0.3 seconds. When the request signal is supplied to the transmitters 102a to 102e, the transmitters 102a to 102e sequentially transmit the request signal to the detection areas 104a to 104e.

When the key 200 is present in the detection areas 104a to 104e to which the request signal has been transmitted, a response signal that is a response signal is returned from the key 200. A receiver 112 is located at a given position of the interior of the vehicle to receive the response signal. Then, the response signal that has been received by the receiver 112 is output to the ECU 106.

Since the CPU 108 outputs the request signal to those five transmitters 102a to 102e in order in the given period as described above, it is possible for the CPU 108 to determine from which detection area 104 the response signal has been transmitted, that is, in which detection area 104 the key 200 is present, by determining the time point at which the response signal has been supplied. Then, a door corresponding to the determined detection area 104 is determined to a control door that is to be controlled or unlocked.

In this embodiment, the detection areas 104 are provided outside the respective doors, respectively, and one door corresponds to one detection area 104. Therefore, the corresponding door is the control door. However, it is possible that the detection area 104 is so adapted as to cover the outer area of each pair of front and rear seat doors. In this case, the pair of doors are determined as the doors corresponding to the detection area, that is, the control door.

Touch sensors 114 are disposed on door outside handles of the four seat-side doors (D seat door, P seat door, DR seat door, PR seat door), respectively. Each of the touch sensors 114 detects that the user touches the corresponding handle, and then supplies a signal indicative of this fact to the ECU 106. A luggage door switch 116 is a switch that is operated by the user when opening the luggage door. The luggage door switch 116 is so positioned as to be exposed to the outside of the vehicle on the luggage door. Thus, when the luggage door switch 116 is depressed or touched by the user, a signal indicative of this fact is supplied to the ECU 106.

A microphone 118 is located at a given portion of the vehicle in order to detect the magnitude of sound in the periphery of the vehicle. A navigation device 120 has a function of detecting the present position of the vehicle, and map data, and executes travel route guide operation based on the detected present position and the map data. Also, the navigation device 120 checks whether the vehicle is positioned indoors or outdoors based on whether the detected present position is within a given building on the map data or not. A clock 122 sequentially outputs a signal indicative of the present time to the ECU 106.

A door lock mechanism 124 is a mechanism that locks the seat-side doors and the luggage door, and controlled by the ECU 106 to make those doors unlocked. Also, the seat-side doors can be made locked under the control of the ECU 106. The luggage door can be also made locked under the control from the ECU 106.

A light source 126 emits a light to notify the user that the door lock mechanism 124 changes from the lock state to the unlock state, or conversely that the door lock mechanism 12 changes from the unlock state to the lock state. The light source 126 is, for example, a foot lamp that is disposed for each of the doors, and illuminates the foot of the user who is going to open the door, or an optical fiber which is disposed on an edge portion of each of the doors, and a LED that is disposed on one end of the optical fiber.

Figure 3A:
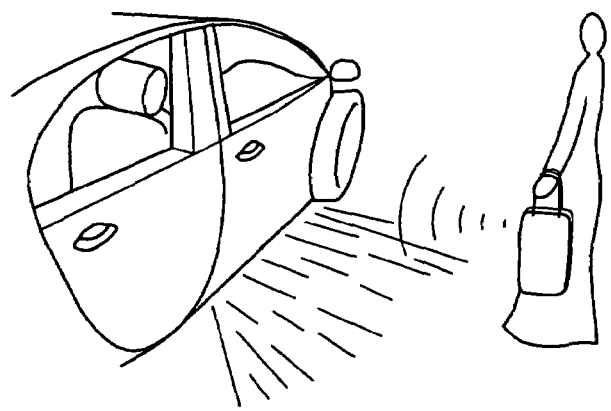
FIGS. 3A and 3B are schematic views showing a state in which a light source disposed on a door emits a light, respectively.
Figure 3B:
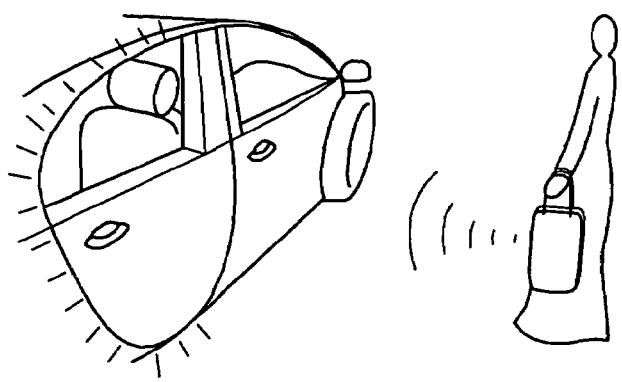

FIG. 3A shows a state in which a foot lamp as the light source 126 emits a light, and FIG. 3B shows a state in which an optical fiber as the light source 126 emits a light. It is unnecessary that the light source 126 is disposed on the door or in the vicinity of the door. The light source 126 can be disposed on the front end of the vehicle or the rear end of the vehicle. Therefore, head lights or tail lights can be used as the light sources 126.

Figure 4:
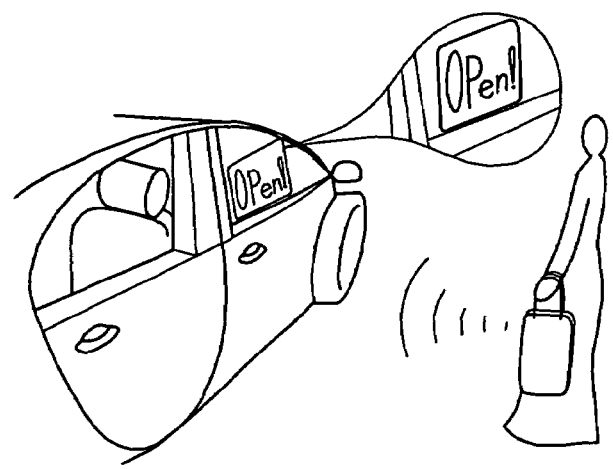
FIG. 4 is a schematic view showing an example in which a window display device is disposed on a driver's seat door, and an image is displayed on the window of the driver's seat door.

A window display device 128 is a device that makes a window display mode disposed on each of the doors different in the mode viewed from the outside, and is used for the above notifying operation as with the light source 126. As the window display device 128, there can be used a device that displays an image on the window by using the same structure as that of a known head-up display. FIG. 4 is a diagram showing an example in which the window display device 128 is disposed on the D seat door, and an image is displayed on the window of the D seat door. In FIG. 4, "Open!" indicating that the door has been unlocked is displayed. As the window display device 128, there can be used a device that merely changes the light transmission of the window, and for example, the light transmission of the window can be made higher than the normal one based on the fact that the door has been unlocked.

Figure 5A:
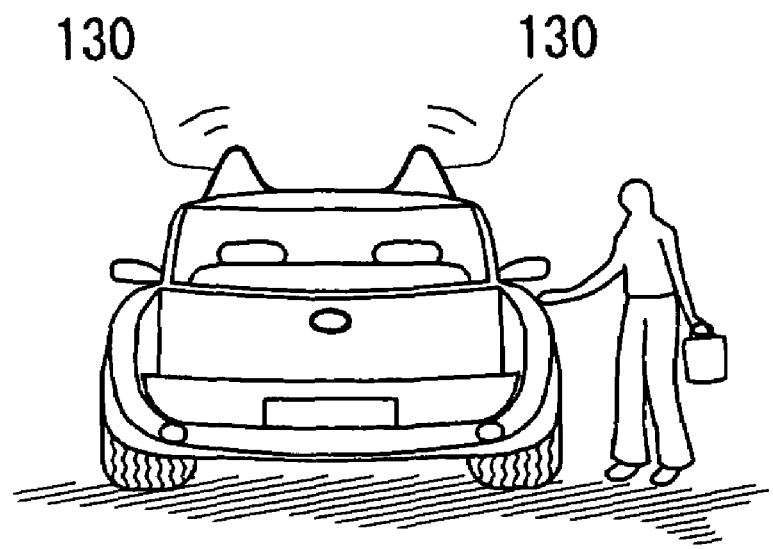
FIGS. 5A and 5B are schematic views showing an example of a moving unit, respectively.
Figure 5B:
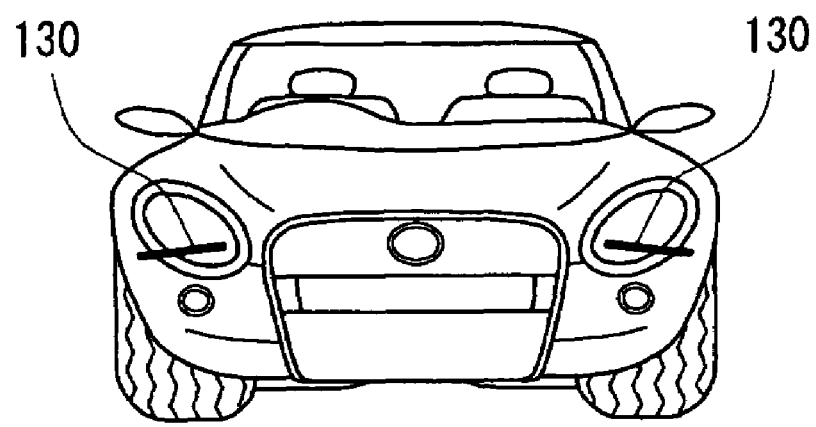

A moving unit 130 is used for the above notifying operation, and a member that is capable of being viewed from the outside of the vehicle can be used as the moving unit 130. FIGS. 5A and 5B show examples of the moving unit 130. The moving units 130 in FIG. 5A are triangular pyramids disposed on a roof of the vehicle, which are rotatably moved in the forward and backward directions of the vehicle with the lower ends as the rotation center. Also, the moving units 130 shown in FIG. 5B are formed of wipers of the headlights. The moving unit 130 can be additionally provided as exemplified in FIG. 5A, and can be formed of existing members provided for another intended purpose as exemplified in FIG. 5B. As the former example, the moving unit 130 may be integrated with a roof antenna so that the roof antenna is driven to move for notification to the outside. Also, as the latter example, wipers of the front window or the rear window may be used as the moving unit 130.

A speaker 132 may also be used for the above notifying operation, and is so adapted as to output a voice toward the outside of the vehicle. It is preferable to provide the speaker 132 in each of the doors, but the number of speakers is less than the number of windows such that the speakers 132 are disposed on the left side and the right side of the vehicle one by one. Also, only one speaker 132 can be provided.

It is not always necessary to dispose all of devices 126, 128, 130 and 132 for the above notifying operation, but only parts of those devices can be provided. The operation of those devices 126, 128, 130 and 132 is controlled by the ECU 106. The memory 110 of the ECU 106 functions as a memory device, and the contents of the notifying operation are stored in the memory 110 for each of the control doors.

As the notifying operation, (1) the light source 126 corresponding to the control door is made to emit a light in a given light emission pattern, (2) a given display is outputted from the window display device 128 corresponding to the control door, (3) a given voice is outputted from the speaker 132 corresponding to the control door, and (4) the moving unit 130 corresponding to the control door is made movable in a given movable pattern.

The light emission pattern of the above notifying operation (1) may include not only blinking in a given period, but also merely lighting. Also, the light emission patterns may be made different from each other depending on the control doors. In this event, even when the number of light sources 126 corresponding to the control doors is smaller than the number of doors (for example, only one), the control contents can be made different according to the control doors. Also, when the light source 126 is formed of plural LEDs, and only parts of the light source 126 can be lighted, a portion of the light source 126 to be lighted can be made different according to the control doors.

The display of the above notifying operation (2) can be set to one kind in advance, but it is preferable that the display contents can be changed. Also, the voice of the above notifying operation (3) can be also set to one kind in advance, but can be preferably changeable. When the display contents and the voice can be changed, the display contents and the voice can be changed within plural options that are set in advance, but it is more preferable that the user is capable of setting favorite display contents and voice.

As an example of the above notifying operation (4), the moving unit 130 is disposed in each of the control doors, and the moving unit 130 corresponding to the control door is movable, but the movable pattern of the moving unit 130 can be made different according to the control doors. In this case, the number of moving units 130 can be smaller than the number of control doors.

In this embodiment, plural notifying operations are set for one control door, and one notifying operation is selected from the plural set notifying operations based on the brightness of the surroundings, the vehicle position (indoors or outdoors), and the noises of the surrounding, and executed.

The notifying operations (1) to (4) can be combined together and used. As an example when the notifying operations are combined together, the light source 126 corresponding to the control door (for example, headlights in the case of the front seat, and taillights in the case of the rear seat) is lighted, and an image is displayed on the control door.

An input key 134 is operated when the contents of the notifying operation which are stored in the memory 110 are changed by the user. With the operation of the input key 134, the image that is displayed on the window can be changed to user's favorite image, or the voice that is outputted from the speaker 132 can be changed to user's favorite music or voice.

The key 200 includes a receiver 202 as a receiving section that receives a request signal transmitted from the transmitter 102, and a transmitter 204 as a transmitting section that transmits the response signal. The key 200 has an ECU (not shown), and the response signal that is sent from the transmitter 204 is generated by the ECU in response to the request signal that is received by the receiver 202.

Figure 6:
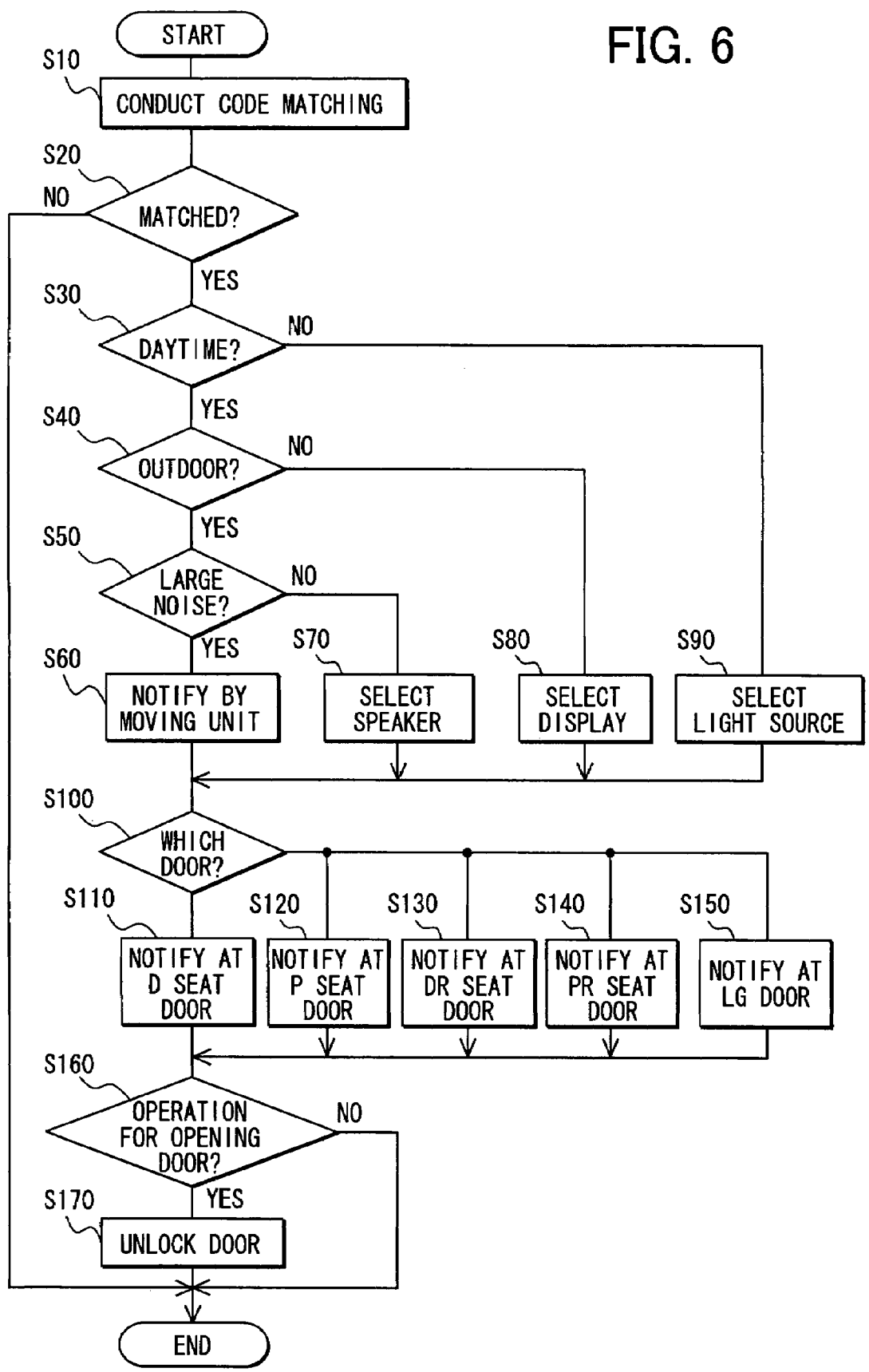
FIG. 6 is a flowchart showing processing executed in response to a response signal when a vehicle is parked and doors are locked.

FIG. 6 is a flowchart showing processing that is executed by the CPU 108 based on a fact that the response signal is supplied to the ECU 106 from the receiver 112 when a vehicle is parked and doors are locked Referring to FIG. 6, at step S10, matching of a code included in the response signal and specific to a mobile device 200 is conducted. Then, at step S20, it is checked whether the code of the mobile device 200 has matched with a code stored in the memory 110 and specific to a vehicle. When the determination is NO, this routine is completed. On the other hand, when the determination is YES, it indicates that the key 200 that has sent the response signal is an authorized key. The processing is further continued, and the control is advanced to step S30. At step S30, it is further checked whether the time is daytime. The determination is conducted based on the signal from the clock 122. At step S30, the brightness surrounding the vehicle is determined. It is possible that a brightness sensor is provided to detect the brightness surrounding the vehicle in fact, and checks whether the brightness is bright or dark.

When it is determined that it is the nighttime (NO), the control is advanced to step S90, and the light source 126 is selected for a notifying operation by lighting. On the other hand, when it is determined that the time is daytime (YES), the control is advanced to step S40, and it is further checked whether the present position is outdoor. The determination is conducted based on the information from the navigation device 120.

When it is determined that the present position is indoor (NO) at step S40, the control is advanced to step S80, and the window display device 128 is selected for a notifying operation by a visual display. On the other hand, when it is determined that the present position is outdoor (YES), the control is advanced to step S50, and it is further checked whether the noise surrounding the vehicle is large. The determination is conducted based on whether the signal that is determined by the microphone 118 being larger than a reference signal.

When it is determined that the noise is large (YES) at step S50, the control is advanced to step S60, and the moving unit 130 is selected for the notifying operation by a moving member. On the other hand, when it is determined that the noise is small (NO), the control is advanced to step S70, and the speaker 132 is selected for a notifying operation by sound.

When any one of steps S60, S70, S80 and S90 is executed, the control is advanced to step S100, and a door whose code matching is acceptable is determined. The determination is conducted based on the response signal received by the receiver 112 responding to the request signal from which transmitter 102 as described above. Also, a door that is determined based on this determination is a control door.

Then, the control is advanced to steps S110 to S150 in response to the determined door (that is, control door) whose matching is acceptable. Steps S110 to S150 execute notifying operation by selected devices 126, 128, 130 and 132, and the operation of a type that is determined at steps S60 to S90 is executed among various operations that are stored as the door control operation in the memory 110. For instance, if the light source 126 is selected at step S90 and the control door is determined to be the D seat door, a light source on the D seat door is activated at step S110.

In subsequent step S160, it is checked whether the touch sensor 114 has been touched or not, and whether the luggage door switch 116 has been operated or not, within a given time after it has been determined that the matching has been confirmed at step S20. This step S160 is for checking whether an operation for opening door has been made. When it is determined that the touch sensor 114 has been touched or it is determined that the luggage door switch 116 has been operated, the determination is YES at step S160. This routine is completed after step S170 corresponding to the operation control has been executed. On the other hand, when it is determined that this determination is NO, this routine is immediately completed.

At step S170, the seat-side door is unlocked when the touch sensor 114 has been touched. Also, when the luggage door switch 116 has been operated, the luggage door is unlocked.

According to this embodiment, when the request signal is transmitted by the transmitter 102, and the key 200 is present within the detection area 104 of the transmitter 102, the response signal is transmitted from the key 200, and the response signal is received by the receiver 112. Then, at step S100, the detection area 104 in which the key 200 exists is determined based on the response signal responding to the request signal that has been transmitted by which transmitter 102, and the door corresponding to the detection area 104 is a control door. Then, the notifying operation that is determined based on that control door is executed (steps S110 to S150).

For that reason, since it is easy to recognize that the matching has been accepted as compared with a case where the same notifying operation is executed even if where the use who carries the key 200 is positioned, the system is easily used by the user.

In particular, the doors are unlocked when the vehicle is parked. In this case, since it is predicted that the user is going to open the door (that is, control door) whose matching has been confirmed, the possibility that the awareness of the user is paid to that door is high. Accordingly, when the notifying operation that has been determined based on the control door is executed, the user can easily recognize that the matching has been confirmed.

Also, in the case of nighttime when notification using light is effective, the light source 126 is used for the notifying operation. Also, under the circumstances where the noises in the periphery of the vehicle are small, and the notification using the voice is effective, the notifying operation using the voice is executed. In this way, since the notifying operation is made different according to each of the control doors, but also the control operation is further made different according to the fact that the environments surrounding the vehicle are different from each other, the user can easily recognize that the matching has been accepted.

The embodiment of the present invention has been described above, but the present invention is not limited to the above embodiment.

For example, in the above embodiment, the request signal is transmitted from the transmitter 102 in a given period, and it is checked whether matching is confirmed or not at the time of detecting the touch sensor 114 has been touched, or the luggage door switch 116 has been operated. Alternatively, it is possible to transmit the request signal based on the fact that the signal from the touch sensor 114 or the luggage door switch 116 has been inputted. Also, although the request signal is transmitted from the transmitters 102a to 102d corresponding to the seat-side door in the given period, the request signal may be transmitted from the transmitter 102e corresponding to the luggage door switch 116 after it is detected that the luggage door switch 116 has been operated. Also, in the above embodiment, the door lock mechanism is unlocked. However, when the door lock mechanism is locked, it is possible to execute a given notifying operation according to each of the control doors.

What is claimed is:

1. An in-vehicle device remote control system, comprising:
a plurality of transmitters that are disposed at a plurality of given positions of a vehicle and transmit transmission request signals, which form different detection areas outside doors of the vehicle;
a mobile device that transmits a response signal in response to the transmission request signal when entering the detection areas;
a receiver that is disposed in the vehicle and receives the response signal of the mobile device;
determining means that executes a given matching process with respect to the response signal of the mobile device for determining that the mobile device is an authorized mobile device when matching is confirmed;
operation control means that controls an operation state of the in-vehicle device based on a determination of the determining means that the mobile device is the authorized mobile device;
control door determining means that determines a detection area in which the mobile device exists based on the response signal of the mobile device and the transmission request signals of the transmitters and sets a door corresponding to the determined detection area as a control door;

a memory device that stores a notifying operation with respect to each control door; and notifying means that executes the notifying operation of the control door determined based on storage contents of the memory device.

2. The in-vehicle device remote control system as in claim 1, wherein:

at least a part of the transmitters transmit the transmission request signal in a given period when the vehicle is parked and the doors are locked;

the operation control means executes unlocking of the doors of the vehicle in response to the response signal of the mobile device, which is the authorized mobile device.

3. The in-vehicle device remote control system as in claim 1, further comprising:

environment determining means that determines an environment around the vehicle, wherein the memory device stores a plurality of notifying operations different from each other in correspondence to different determined environments with respect to each control door, respectively, and wherein the notifying means executes the notifying operation stored in the memory device in relation to the control door and the determined environment.

4. The in-vehicle device remote control system as in claim 3, wherein:

the memory device stores a notifying operation by light as one of the notifying operations;

the environment determining means includes brightness determining means for determining brightness around the vehicle; and the notifying means executes the notifying operation using the light when the brightness around the vehicle is determined to be dark.

5. The in-vehicle device remote control system as in claim 3, wherein:

the memory device stores a notifying operation by sound as one of the notifying operations;

the environment determining means includes noise determining means for determining noise level around the vehicle; and the notifying means executes the notifying operation using the sound when the noise level around the vehicle is small.

6. The in-vehicle device remote control system as in claim 1, wherein:

the memory device is capable of being changed with respect to the notifying operations from an external side.

7. An in-vehicle device remote control method for a vehicle comprising:

transmitting a plurality of response request signals from the vehicle in different directions in surrounding areas of the vehicle so that a response signal is received from a mobile device in response to any one of the response request signals;

receiving the response signal from the mobile device;

determining a location of the mobile device based on a relation between transmitted response request signals and a received response signal;

notifying a reception of the response signal to an outside of the vehicle by a device provided near a door which is closest to a determined location of the mobile device.

8. The in-vehicle device remote control method for a vehicle as in claim 7, further comprising:

detecting an environment condition of the vehicle; and changing a mode of a notification in correspondence to a detected environment condition.

9. The in-vehicle device remote control method for a vehicle as in claim 8, wherein:

the mode of a notification is selected from a plurality of modes of notification stored in a memory as a function of a plurality of environment conditions of the vehicle.

10. An in-vehicle device remote control method for a vehicle comprising:

transmitting a plurality of response request signals from the vehicle in different directions in surrounding areas of the vehicle so that a response signal is received from a mobile device in response to any one of the response request signals;

receiving the response signal from the mobile device;

determining an environment condition of the vehicle; and notifying a reception of the response signal to an outside of the vehicle by light or sound in a mode variable with a determined environment condition of the vehicle.

* * * * *